(12) United States Patent
Harris et al.

(10) Patent No.: US 11,017,464 B1
(45) Date of Patent: May 25, 2021

(54) DETECTING ACCOUNT TAKEOVER FRAUD FROM DIGITAL TRANSACTIONAL DATA

(71) Applicant: Coupa Software Incorporated, San Mateo, CA (US)

(72) Inventors: Scott Harris, Menlo Park, CA (US); Ahmad Sadeddin, San Francisco, CA (US); Maggie Mae Joy, Crownsville, MD (US); Joshua Danielson, San Francisco, CA (US)

(73) Assignee: Coupa Software Incorporated, San Mateo, CA (US)

( * ) Notice: Subject to any disclaimer, the term of this patent is extended or adjusted under 35 U.S.C. 154(b) by 0 days.

(21) Appl. No.: 16/239,442

(22) Filed: Jan. 3, 2019

(51) Int. Cl.
*G06Q 40/00* (2012.01)
*G06Q 40/02* (2012.01)
*H04L 29/06* (2006.01)
*G06Q 20/40* (2012.01)

(52) U.S. Cl.
CPC ......... *G06Q 40/02* (2013.01); *G06Q 20/4016* (2013.01); *H04L 63/1416* (2013.01); *H04L 63/1483* (2013.01)

(58) Field of Classification Search
USPC ....... 705/42, 38, 39, 37, 40; 455/410, 456.2; 719/328; 717/108; 463/25, 40; 700/236, 700/245; 706/25; 318/611; 606/130; 235/375, 380; 340/540
See application file for complete search history.

(56) References Cited

U.S. PATENT DOCUMENTS

| | | | | |
|---|---|---|---|---|
| 6,219,538 B1* | 4/2001 | Kaminsky | ............. | H04M 15/47 455/410 |
| 7,403,922 B1* | 7/2008 | Lewis | ................ | G06Q 10/0635 705/38 |
| 7,610,040 B2* | 10/2009 | Cantini | .................. | G06Q 20/04 340/5.9 |

(Continued)

OTHER PUBLICATIONS

Ontology Based on Electronic Payment Fraud Prevention; Ahmed El Orche, Mohamed Bahaj, Soumya Ain Alhayat; 2018 IEEE 5th International Congress on Information Science and Technology (CiSt) (pp. 143-148); Oct. 27, 2018. (Year: 2018).*

*Primary Examiner* — Tien C Nguyen
(74) *Attorney, Agent, or Firm* — Baker Botts L.L.P.

(57) ABSTRACT

A fraud detection system for detecting fraudulent acts related to account takeover in digital transactions is disclosed. In some embodiments, the fraud detection system is programmed to detect occurrences of triggering events for account takeover fraud. The triggering events generally include changes related to the taken-over account, such access patterns, account data, or linked transactional data. In response to detecting the occurrence of one triggering event, the fraud detection system is programmed to determine whether the triggering event corresponds to potential fraud by analyzing historical triggering events and triggering events involving similar accounts. In response to identifying potential fraud, the fraud detection system is programmed to send a notification of the potential fraud to a device associated with the taken-over account before the triggering event or a device associated with an affected account engaged in a transaction with the taken-over account. The fraud detection system can also be programmed to suspend or postpone the transaction.

20 Claims, 12 Drawing Sheets

(56) References Cited

U.S. PATENT DOCUMENTS

| | | | | |
|---|---|---|---|---|
| 8,612,479 B2* | 12/2013 | Bammi | ................ | G06F 21/552 |
| | | | | 707/776 |
| 8,949,150 B2* | 2/2015 | Siddens | ............. | G06Q 20/4016 |
| | | | | 705/39 |
| 2009/0157454 A1* | 6/2009 | Carter | .................... | G06Q 99/00 |
| | | | | 705/7.27 |
| 2011/0196791 A1* | 8/2011 | Dominguez | ........... | G06Q 20/40 |
| | | | | 705/44 |
| 2012/0244885 A1* | 9/2012 | Hefetz | ................ | G06Q 20/322 |
| | | | | 455/456.2 |
| 2012/0323783 A1* | 12/2012 | Canetto | ............... | G06Q 20/405 |
| | | | | 705/44 |
| 2017/0357977 A1* | 12/2017 | Pitz | ........................ | G06Q 20/32 |

* cited by examiner

Produc ion

External SIM Update Form - Response #3202 (Pending Approval)

Bank Account Warnings:
- Unrequested Bank Account update with only CSP user [Max Smith@acme.com] (Bank of US -- ******543)
- Different Account than commonly used by this supplier with other Coupa buying orgs (****543 instead of ****121)

Supplier Contact Info: James Max (415) 555-9123 (local -- updated 12/18/2018) | (800) 555-0012 (commonly -- 12 buying orgs)

Supplier Information: Acme Services Corp.

Name: Acme Services Corp.

Bank Name: Bank of San Mateo
* Bank Account Number: ******543
* Bank Routing Number: 12345678

Approvers

Dhvya Parthiban — supriya mahajan — supriya mahajan — admin user2 — Dhvya Parthiban

[Add]

402 — 404 — 406 — 408 — 400

DETECTING ACCOUNT TAKEOVER FRAUD FROM DIGITAL TRANSACTIONAL DATA

FIELD OF THE DISCLOSURE

One technical field of the present disclosure is digital data analysis, transmission, and display. Another technical field is detection of account takeover fraud from digital data communicated between sender devices and receiver devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In digital transactions transferring ownership of items from a sender account to a receiver account, account takeover fraud may occur, where a third party gains access to the receiver account without permissions and receives the items or other benefits via the receiver accounts from the sender account. For example, the sender account can be a supplier account sending a product key to a purchased software product, and the receiver account can be a buyer account receiving the product key; the sender account can be the buyer account sending an electronic payment, and the receiver account can be a supplier account receiving the payment; the sender account can be a buyer employer account sending an expense reimbursement, and the receiver account can be a buyer employee account receiving the expense reimbursement. The account takeover fraud results in invalid transactions and lost resources. It would be helpful to implement effective measures against the account takeover fraud in a system that manages a plurality of sender accounts and receiver accounts conducting a large number of digital transactions.

BRIEF DESCRIPTION OF THE DRAWINGS

In the drawings:

FIG. 2B illustrates an example digital purchase order.

FIG. 2C illustrates an example digital invoice.

FIG. 4A illustrates an example screen of a graphical user interface programmed to show notifications, alarms, or warnings of triggering events during the approval process for a supplier information management form associated with a supplier account.

DETAILED DESCRIPTION

Figure 1:
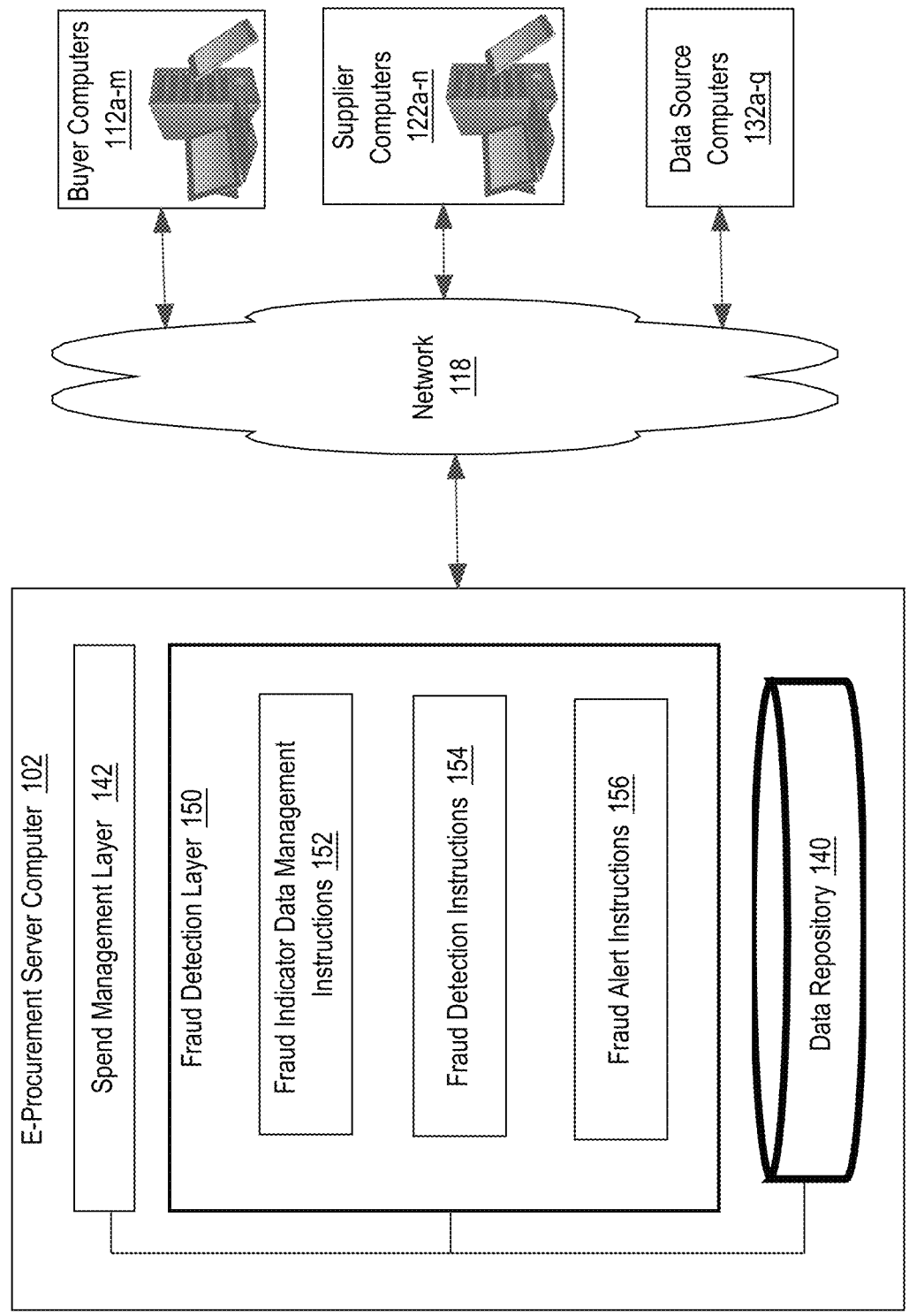
FIG. 1 illustrates an example networked computer system with which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:

1. GENERAL OVERVIEW
2. EXAMPLE COMPUTING ENVIRONMENTS AND COMPUTER COMPONENTS
3. FUNCTIONAL DESCRIPTIONS
   3.1. DETECTING POTENTIAL FRAUD RELATED TO ACCOUNT TAKEOVER
      3.1.1. DETERMINING WHEN TO DETECT POTENTIAL FRAUD
      3.1.2. DETERMINING WHAT TO CONSIDER AS POTENTIAL FRAUD
   3.2. HANDLING POTENTIAL FRAUD RELATED TO ACCOUNT TAKEOVER
4. EXAMPLE PROCESSES
5. IMPLEMENTATION EXAMPLE—HARDWARE OVERVIEW
6. EXTENSIONS AND ALTERNATIVES

1. General Overview

A fraud detection system for detecting fraudulent acts related to an account takeover in digital transactions is disclosed. In some embodiments, the fraud detection system is programmed to detect occurrences of triggering events for account takeover fraud. The triggering events generally include changes related to the taken-over account, such access patterns, account data, or linked transactional data. In response to detecting the occurrence of a triggering event, the fraud detection system is programmed to determine whether the triggering event corresponds to potential fraud by analyzing historical triggering events and triggering events involving similar accounts. In response to identifying potential fraud, the fraud detection system is programmed to send a notification of the potential fraud to a device associated with the taken-over account before the triggering event or a device associated with an affected account engaged in a transaction with the taken-over account. The fraud detection system can also be programmed to suspend or postpone the transaction.

In some embodiments, the fraud detection system is programmed or configured with data structures and/or database records that are arranged to manage a first plurality of receiver accounts and a second plurality of sender accounts.

For example, a sender account can be a buyer account sending a payment for an order, and a receiver account can be a supplier account receiving the payment. The fraud detection system is programmed to continuously detect the occurrence of a triggering event, which typically corresponds to a key point of an account takeover. For example, the triggering event can be when the supplier account is potentially logged in by a third party's device, when the banking information or more broadly payment acceptance information in the supplier account designated for transactions with the buyer account is potentially changed by the third party device, or when an invoice containing banking information to be transmitted to the buyer account is potentially updated by the third party device. In addition, the triggering event can be when potential fraud is identified with another managed receiver account.

In some embodiments, the fraud detection system is programmed to determine whether the triggering event corresponds to potential fraud based on at least the relevant data used by the receiver account with other sender accounts or by other receiver accounts. For example, when the triggering event is having updated banking information in this month's invoice to the buyer account compared to the banking information in last month's invoice to the buyer account and when the updated banking information is different from the banking information in this month's invoices to the remaining five buyer accounts communicating with the supplier account, the triggering event is more likely to be identified as corresponding to potential fraud. For further example, when the triggering event is having new banking information in an invoice to the buyer account in place of a remit-to address and when supplier accounts in the same industry typically always include only a remit-to address in an invoice, the triggering event is more likely to be identified as corresponding to potential fraud. The fraud detection system can also be programmed to determine whether the triggering event corresponds to potential fraud based on prior triggering events that occurred between the receiver account and the sender account and the amount of time elapsed between these triggering events. For example, when the current triggering event is having different banking information in the supplier account compared to the banking information in the supplier account yesterday and when there exists a prior triggering event of having a new device accessing the supplier account just five minutes ago, the current triggering event is more likely to be identified as corresponding to potential fraud.

In some embodiments, the fraud detection system is programmed to handle the potential fraud by sending a request for confirming the account takeover to a device associated with the receiver account before the triggering event to increase the chance of reaching the supplier. The fraud detection system can also be configured to notify the affected sender account. The fraud detection system can be configured to act proactively in terms of deactivating the receiver account or at least blocking or postponing transactions involving the receiver account or wait until a confirmation or instruction from the receiver account or the receiver is received. The initial notification to the receiver account or the sender account can include information regarding the triggering event, such as the previous banking information used before the triggering event and the current banking information supplied during the triggering event, or a reason for identifying the triggering event as potential fraud.

The fraud detection system produces various technical benefits. By preventing or catching account takeover fraud, the fraud detection system improves accuracy and integrity of digital transactional data between the receiver account and the sender account and deters account takeover fraud by a third party. By providing a warning of potential fraud to devices associated with the taken-over account and an affected account engaged in one or more transactions with the taken-over account, or taking other remedial measures, the fraud detection system reduces wasted computing resources for processing and transmitting further transactional data communicated between these devices. By extending fraud detection efforts to other managed accounts, the fraud detection system provides similar benefits to more managed accounts and further reduces wasted computing resources.

2. Example Computing Environments and Computer Components

FIG. 1 illustrates an example networked computer system with which various embodiments may be practiced. FIG. 1 is shown in simplified, schematic format for purposes of illustrating a clear example and other embodiments may include more, fewer, or different elements.

In some embodiments, the networked computer system comprises an e-procurement server computer 102 ("server"), one or more supplier computers 122*a-n*, one or more buyer computers 112*a-m*, and one or more data source computers 132, which are communicatively coupled directly or indirectly via one or more networks 118.

In some embodiments, the server 102 broadly represents one or more computers, such as a server farm, a cloud computing platform, or a parallel computer, virtual computing instances, and/or instances of a server-based application. The server 102 comprises a spend management layer 142 that is programmed or configured to host or execute functions including but not limited to managing buyer accounts associated with the one or more buyer computers 112*a-m* and supplier accounts associated with the one or more supplier computers 122*a-n*, and facilitating generation and maintenance of digital documents during procurement transactions between buyer accounts and supplier accounts, such as catalogs, purchase requisitions, purchase orders, or invoices. The server 102 also comprises a fault detection layer 150 that is programmed or configured to host or execute functions including but not limited to detecting potential account takeover fraud committed by a third party to a receiver account to obtain benefits from a sender accounts and reporting the potential fraud to a device associated with the receiver account or the sender account.

FIG. 1 also illustrates example components of the server 102 in accordance with the disclosed embodiments. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the fraud detection layer 150 can comprise computer-executable instructions, including fraud indicator data management instructions 152, fraud detection instructions 154, and fraud alert instructions 156. In addition, the server 102 can comprise a database module 140.

In some embodiments, the fraud indicator data management instructions 152 enable maintaining and analyzing data that may be tied to fraudulent behavior, such as an account takeover. Such data is generally related to security of an account or acquisition of items by an account, such as account credentials, account access mechanisms, remit-to addresses, banking information, delivery addresses, or primary contact signatures. Such data may already be stored within the accounts or can also be temporarily in transit, such as a transactional document just generated, to be transmitted, and not yet saved in an account. A change in such data can result in a triggering event for detecting potential fraud. Management of the fraud indicator data can include maintaining different versions of such data over time for each account with respect to every other account in communication with this account.

In some embodiments, the fraud detection instructions 154 enable determining whether a triggering event corresponds to potential fraud of taking over a receiver account engaging in a transaction with a sending account. A triggering event may not correspond to potential fraud when the triggering event is not significantly suspicious. The determining can be based on current or prior triggering events between one or more receiving accounts, including the receiving account, and one or more sending accounts, including the sending account. The determining can also be based on additional data, such as a blacklist of banking account origins, industry-wide banking regulations or practices, or existing agreements between accounts.

In some embodiments, the fraud alert instructions 156 enable taking cautionary or remedial measures for potential fraud committed by a third party of taking over a receiving account that is supposed to receive ownership certain items from a sending account. These measures can include sending a request to confirm or dismiss the potential fraud to a receiver computer of the receiver account, sending an alert to a sender computer of the sending account, blocking or postponing transmission of the certain items, or initiating additional fraud detection for other receiver accounts similar to the receiver account. These measures can be taken as soon as an occurrence of a triggering event is detected, when the triggering event is identified as corresponding to potential fraud, when the next transaction document is transmitted to the sender account, or other times before the ownership of the items is to be transferred.

In some embodiments, the database module 140 is programmed or configured to manage relevant data structures and store relevant data for functions performed by the server 102. In association with the fraud detection layer 150, the data may include fraud indicator data, fraud detection results, or fraud alerts.

In some embodiments, each of the buyer computers 112*a-m* broadly represents one or more computers, virtual computing instances, and/or instances of an e-procurement application program that are associated with an institution or entity that is related as a buyer with respect to a separate entity associated with one of the supplier computers 122*a-n*. A buyer computer 112*a* is programmed to create a buyer account with the server 102 and manage digital documents related to a buyer account during procurement transactions, such as receiving a catalog of items for sale from the server 102, generating or transmitting a purchase requisition or purchase order for some of the items for sale to the server 102, or receiving an invoice for some of the items for sale from the server 102. The buyer computer 112*a* may comprise a desktop computer, laptop computer, tablet computer, smartphone, wearable device, or any other type of computing device that is capable of proper communication with the server 102 as well as adequate local data processing and storage. In some cases, a buyer computer 112*a* may be a personal computer or workstation that hosts or executes a browser and communicates via HTTP and HTML over the network 118 with a server-side e-procurement application hosted or executed at the server 102. In other cases, a buyer computer 112*a* may be a server-class computer and/or virtual computing instance that hosts or executes an instance of an e-procurement application that communicates programmatically via API calls, RPC or other programmatic messaging with the server 102.

Similarly, in some embodiments, each of the supplier computer 122*a-n* broadly represents one or more computers, virtual computing instances, and/or instances of an e-procurement application program that are associated with an institution or entity that is related as a supplier with respect to a separate entity associated with one of the buyer computer 112*a-m*. A supplier computer 122*a* is programmed to create a supplier account with the server 102 and manage digital documents related to a supplier account during procurement transactions, such as generating or transmitting a catalog of items for sale to the server 102, receiving a purchase order for some of the items for sale from the server 102, or generating or transmitting an invoice for some of the items for sale to the server 102. A supplier computer 122*a* may comprise a desktop computer, laptop computer, tablet computer, smartphone, wearable device, or any other type of computing device that is capable of proper communication with the server as well as adequate local data processing and storage. In some cases, a supplier computer 122*a* may be a personal computer or workstation that hosts or executes a browser and communicates via HTTP and HTML over network 118 with a server-side e-procurement application hosted or executed at the server 102. In other cases, a supplier computer 122*a* may be a server-class computer and/or virtual computing instance that hosts or executes an instance of an e-procurement application that communicates programmatically via API calls, RPC or other programmatic messaging with the server 102.

In some embodiments, each of the data source computer 132*a-q* broadly represents one or more computers, virtual computing instances, and/or instances of a data management application program with a communication interface. A data source computer 132*a* is programmed to manage one or more data sources, receive a request for certain data in the one or more data sources from the server 102, and send a response to the request to the server 102. The data source computer 132*a* can comprise any computing facility with sufficient computing power in data processing, data storage, and network communication for the above-described functions.

In some embodiments, the network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, through the fraud detection layer 150, the server 102 is programmed to receive or transmit transactional data, such as supplier (onboarding) information management form, purchase orders, invoices, or payments from or to the buyer computers 112*a-m* or the supplier computers 122*a-n*. In other embodiments, the server 102 is programmed to receive or transmit additional transactional data, such as expense reports, from or to one of the buyer computers 112a-112m representing an organization and another one of the buyer computers 112a-112m representing an individual, and similarly from or to one of the supplier computers 122a-112n representing an organization and another one of the supplier computers 122a-122n representing an individual. The server 102 is programmed to also store such transactional data in association with the appropriate accounts in a storage device, such as the data repository 140. Such transactional data may include banking information for receiving a payment or delivery information or more broadly product acceptance information for receiving a product of goods or services. Such transactional data can also include delivery approval information for approval delivery of products or payment approval information for approving transmission of payments.

In some embodiments, the server 102 is programmed to manage account access and update histories indicating how the accounts are accessed or how account data is updated by the buyer computers 112-m, supplier computers 122a-n, or other computers in a storage device. The account data may include account credentials or permissions or transactional data stored in association with the accounts. The server 102 is programmed to further receive additional data from the data source computers 132a-q that can be used to assess the triggering events. The additional data may include industry-wide practices for payment or delivery handling or for computer security management or corporate data including office addresses, financial partners, etc. The server 102 is programmed to also store such additional data in a storage device, such as the data repository 140.

In some embodiments, upon detecting an occurrence of a triggering event, such as a change in the transactional data or account data associated with a particular account, a violation of an existing transactional agreement or operating regulations, or an identification of potential fraud of another account, the server 102 is programmed to detect any potential fraud of taking over the particular account by analyzing the stored transactional data, the account access and update histories, and the additional data. The server 102 is programmed to then send a notification of any detected potential fraud to a particular computer associated with the particular account before the triggering event or another computer associated with an affected account engaging in a transaction with the particular account. The server 102 can also be programmed to prevent any further engagement in a transaction between the particular account and the affected account before or after sending a request for confirming the potential fraud to the particular computer.

3. Functional Descriptions 3.1. Detecting Potential Fraud Related to Account Takeover In some embodiments, e-procurement server computer (server) 102 is programmed to manage supplier accounts associated with suppliers and supplier computers and buyer accounts associated with buyers and buyer computers. A supplier account includes digital data related to a supplier and enables the selling of goods or services by the supplier, while a buyer account includes digital data related to a buyer and enables the purchasing of goods or services by the buyer. The server 102 is programmed to coordinate digital communications between supplier accounts and buyer accounts during procurement transactions, including facilitating the completion or transmission of specific transactional data or documents. The server 102 is programmed to also maintain configurations in the supplier accounts or buyer accounts, including preferences related to detecting account takeover fraud, as further discussed below. The configurations can be initialized to default values determined by the server 102 or set to values provided by a supplier account, a buyer account, or the server 102 at a given time.

In some embodiments, the server 102 is similarly programmed to manage employee accounts associated with employee computers under a supplier account or a buyer account as an employer account. An employer account includes digital data related to an employer and enables the management of revenue and expenses by the employer, while an employee account includes digital data related to an employee and enables the management of projects and expenses by the employee. The server 102 is programmed to coordinate digital communications between employer accounts and employee accounts during advanced procurement or expense management transactions, including facilitating the completion or transmission of specific transactional data or documents. The server 102 is programmed to also maintain configurations in the employer accounts or employee accounts, including employer preferences related to detecting employee account takeover fraud, as further discussed below. The configurations can be initialized to default values determined by the server 102 or set to values provided by an employer account, an employee account, or the server 102 at a given time.

3.1.1. Deciding when to Detect Potential Fraud

In some embodiments, the server 102 is programmed to define triggering events that trigger the detection of potential fraud. In general, account takeover fraud occurs when a third party uses a first party's account without permissions to obtain benefits, such as products or money, from a second account. Typically, the (taking-over) third party is able to use the (taken-over) first party's account without permissions because the third party has gained access to at least part of the credentials of the first party's account, such as a user name or a password. This may include the scenario where the third party has obtained the user name and used the "reset password" feature to gain access to the first party's account. It is then possible that the third party changes the account credentials or permissions for the convenience of the third party or a conspirator of the third party. Such a change may include or an update of the email address, cell phone number, or other identifiers of a primary account used for two-phase authentication. Such a change may also include an update of a list of employee accounts that can access this employer account or specific permissions granted to the list of employee accounts.

In some embodiments, the account being taken over can be a supplier account or an employee account. In this case, the takeover typically further involves the third party changing the banking information, product delivery approval information, a payment amount, or other information related to receiving payments in the first party's account to illegally obtain money. The account being taken over can also be a buyer account. In this case, the takeover typically further involves the third party changing payment approval information, a product quantity, delivery information, or other information related to receiving products in the first party's account to illegally obtain goods or services. The account being taken over can also be an employee account. In this case, the takeover typically further involves the third party changing the banking information in the first party's account to illegally obtain money. Typically, what subsequently happens is that a transaction document that contains the third party's information for obtaining benefits is issued from the first party's account. The third party's information may come from the first party's account (after an impermissible update) or inserted directly into the transaction document.

Figure 2A:
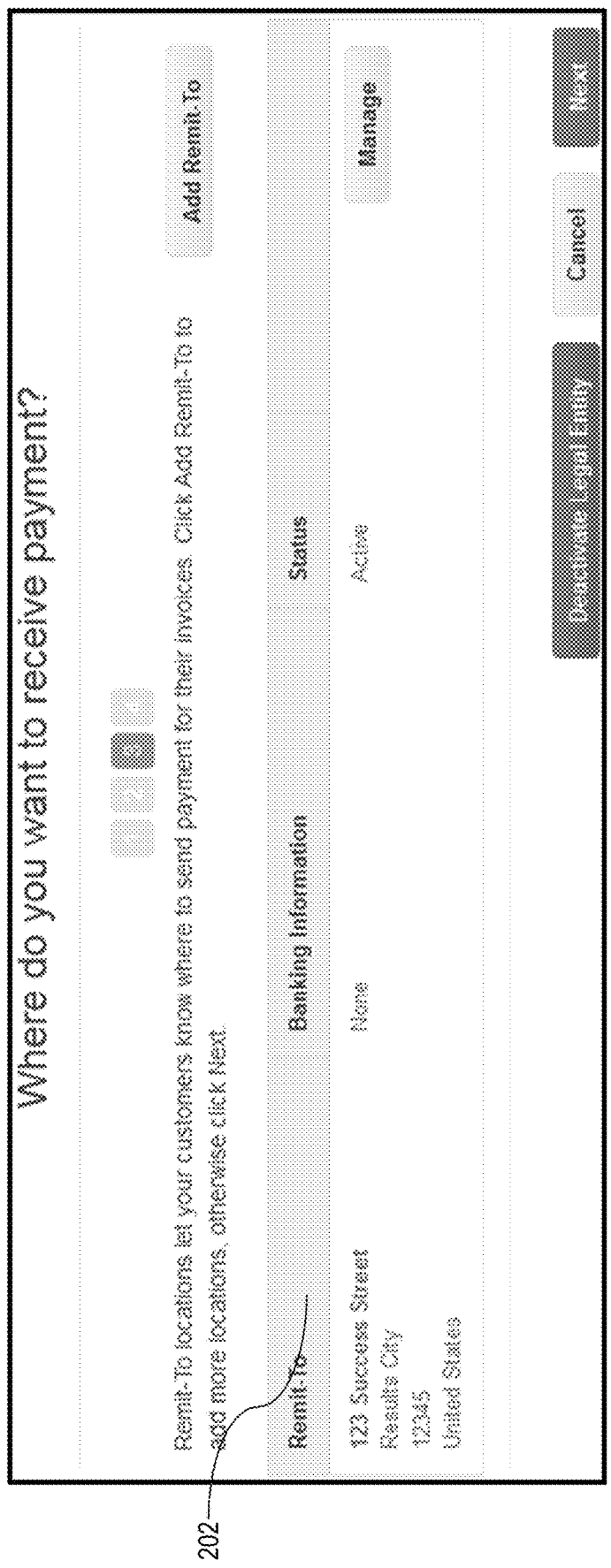
FIG. 2A illustrates an example digital supplier onboarding form.

FIG. 2 illustrates example types of transaction documents. FIG. 2A illustrates an example digital supplier onboarding form. In some embodiments, the server 102 is programmed to enable a supplier account to generate an onboarding form that contains information regarding an associated supplier. The server 102 is programmed to further transmit the onboarding form or a portion thereof to a buyer computer associated with a buyer account. The onboarding form generally includes data indicating how the supplier would like to receive payments, such as a remit-to address including a primary contact or banking information 202 for one or more buyers. The banking information typically includes an identifier of a bank, an identifier of an account with the bank, and a description of how to deposit money into that account. The server 102 is generally programmed to store at least part of the onboarding form in a storage device. For example, the remit-to address or banking information 202 can be stored, together with an identifier of the supplier account, an identifier of the buyer account, or the date the onboarding form was created or last modified.

Figures 2B, 2C:
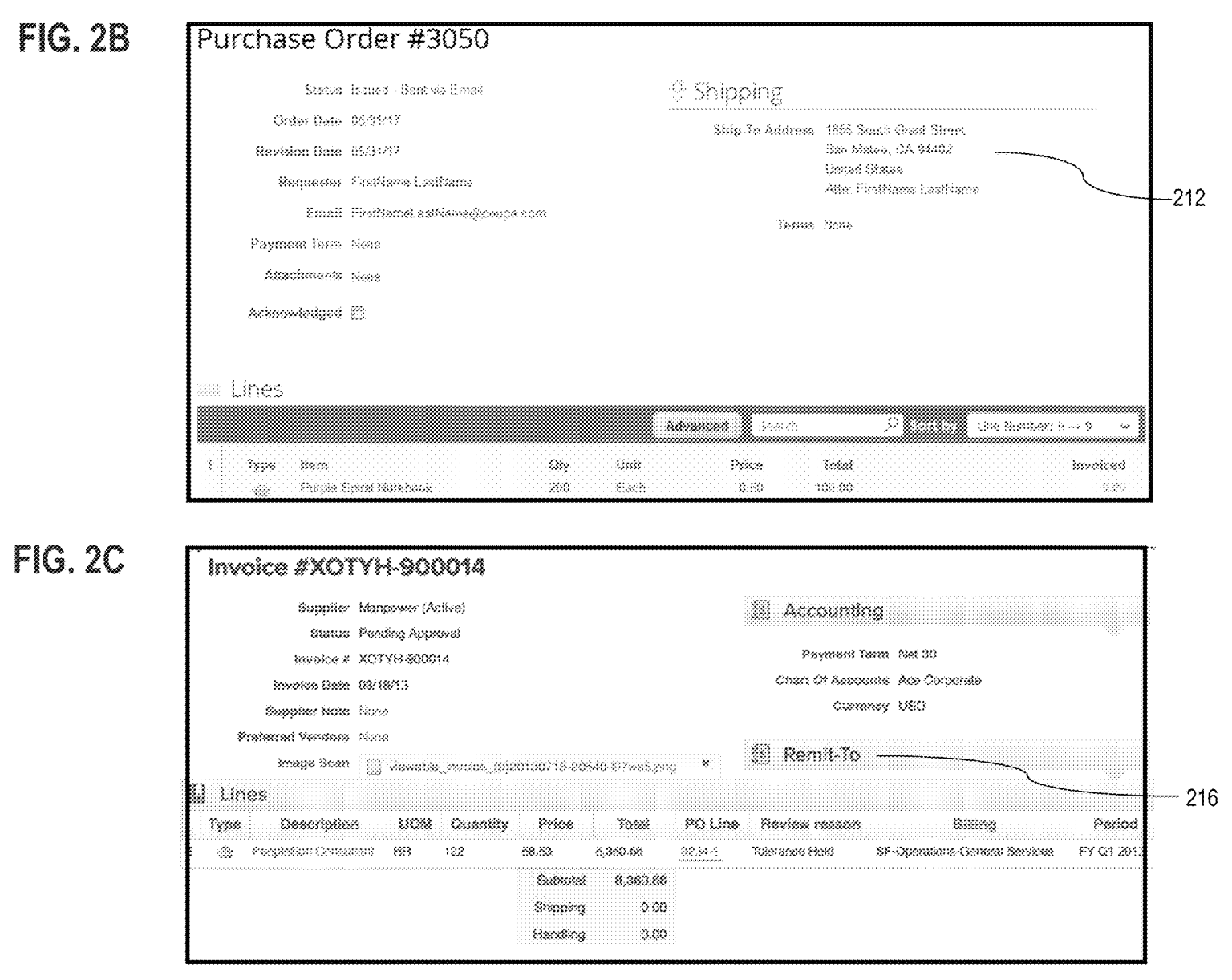

FIG. 2B illustrates an example digital purchase order. In some embodiments, the server 102 is programmed to allow a buyer account to create a purchase order that contains information regarding an order made by the associated buyer of products offered by a supplier of a supplier account. The server 102 is programmed to then transmit the purchase order to a supplier computer associated with the supplier account. The purchase order generally includes data indicating where the buyer would like to receive the products, such as the ship-to address 212. The server 102 is generally programmed to store at least part of the purchase order in a storage device. For example, the ship-to address 212 can be stored, together with an identifier of the buyer account, an identifier of the supplier account, or the date the purchase order was created or last modified.

FIG. 2C illustrates an example digital invoice. In some embodiments, the server 102 is programmed to allow a supplier account to create an invoice that contains information regarding a payment to be received by an associated supplier for an order made by a buyer of a buyer account. The server 102 is programmed to then transmit the invoice to the buyer computer associated with the buyer account. Similar to the supplier onboarding form discussed above, the invoice generally includes data indicating where the supplier would like to receive the payment, such as the remit-to section 216, which might be further expanded. The server 102 is generally programmed to store at least part of the invoice in a storage device. For example, the remit-to section 216 can be stored, together with an identifier of the supplier account, an identifier of the buyer account, or the date the invoice was created or last modified.

In some embodiments, the server 102 can be programmed to define a triggering event that corresponds to any point during the above-described account takeover process, such as when a new party or a new device accesses an account, when a portion of account credentials or permissions is changed, when product delivery approval information, payment amounts, banking information, payment approval information, product quantities, or delivery information in an account is changed, or when a transaction document issued from a source account is generated or submitted to an intended destination account that contains different banking information or delivery information or unusual payment amounts or product quantities compared to the same type of information already in the source account or the last transaction document of the same type between the source account and the destination account. Generally, in responding to a triggering event that occurs later in the process, the server 102 may have more relevant information available, including the knowledge of earlier occurrences of additional triggering events, and can identify potential fraud with higher certainty.

More specifically, the server 102 can be configured to determine whether a new or different party is assessing an account. The new or different party may be associated with a newly created (employee) account or an existing (employee) account with newly granted permissions. The server 102 can also be configured to determine whether a new or different device is accessing an account based on the IP address, device type, or other identifying information regarding a device that accesses the account, or the user ID, account ID, or other identifying information regarding an employee that accesses the account belonging to the employer. In addition, the server 102 can be configured to monitor the generation or transmission of transaction documents of many types, such as an onboarding form issued from a supplier account containing new or different banking information that may be carried over to subsequent transaction documents, an invoice issued from a supplier account containing new or different banking information, or a purchase order issued from a buyer account containing new or different delivery information, as discussed above, or a buyer profile issued from a buyer account containing new or different delivery information that may be carried over to subsequent transaction documents, a payment form issued from a buyer account containing new or different delivery information, a payment receipt issued from a supplier account containing new or different banking information, an employee profile issued from an employee account containing new or different banking information, or an expense report issued from an employee account containing new or different banking information.

In some embodiments, the server 102 is programmed to define additional triggering events corresponding to violations of existing rules, law, or contacts. For example, when an agreement between the server 102 and an employer account grants permission for changing the banking information of the employer account to only certain employee accounts, a change of the banking information by an employee account other than the certain employee accounts could constitute a triggering event. For further example, when a contract between a buyer account and a supplier account allows changing the delivery address before a certain date, a change of the delivery address by the buyer account on or after the certain date could constitute a triggering event.

In some embodiments, the server 102 is programmed to define other triggering events when potential fraud involving another account is identified. The server 102 can be configured to automatically raise such a triggering event or allow an affected account in a transaction with a potentially taken-over account in a community to raise such a triggering event. Furthermore, the server 102 can be configured to raise a triggering event only when certain criteria are satisfied. The certain criteria can include that it is not the first time that the same account is taken over or is not the first time the same third party is suspected of potential fraud. The certain criteria can further include that the number of affected accounts or the total amount of payment made or product delivered to the third party exceeds certain thresholds.

3.1.2. Determining What to Consider as Potential Fraud

In some embodiments, in response to detecting an occurrence of a triggering event, the server 102 is programmed to detect potential fraud, including account takeover fraud. For each triggering event corresponding to a potential takeover of a (taken-over) account first of a first party by a third party (taking-over) affecting a second account of a second party conducting transactions with the first party, the server 102 is programmed to evaluate the triggering event using different approaches to assign a score to the triggering event indicating the likelihood of potential fraud.

In some embodiments, the server 102 is programmed to first evaluate the triggering event with respect to data in the first account. When the triggering event does not actually affect the first account, such as when the triggering event is the takeover of a similar account, the server 102 can be configured to assign a relatively lower score to the triggering event. When the triggering event is not permitted under any agreement associated with the first account, the server 102 is configured to assign a relatively high score to the triggering event. When the triggering event is permissible under the agreement associated with the first account, the server 102 is configured to then determine whether the triggering event is consistent with the data in the first account. Specifically, the server 102 can be configured to correlate one or more of a mailing address of the first party, a remit-to address of the first party, a mailing address of a bank of the first party, or the address of the physical location of a computer accessing the first account that are in the first account or in a transaction document issued from the first account. The server 102 can be further configured to increase the score of the triggering event in response to the provision of any address that is distant from the other addresses.

In some embodiments, the server 102 is programmed to evaluate the triggering event with respect to relevant system-wide or external data. Such relevant data can also include system usage policies or general account regulations. The server 102 can be further configured to significantly increase the score of the triggering event in response to the violation of any of these policies or regulations. Such relevant data can also include a blacklist of countries or regions that have a reputation for holding suspicious money transfer policies or risky bank accounts. The server 102 can be further configured to significantly increase the score of the triggering event in response to the provision of any banking information that matches the blacklist.

In some embodiments, the server 102 is programmed to also evaluate the triggering event with respect to triggering events involving the first account and the second account in the past. The server 102 can be configured to increase the score of the triggering event more when the triggering event has not happened in a permissible manner in the past. For example, when the triggering event is a change of a remit-to address to a certain value issued from the first account, the server 102 can be configured to increase the score less when the first party provided the certain value to the second party before (moving back to the address having the certain value) or when the first party changed the remit-to address before (moving frequently).

In some embodiments, the server 102 is programmed to further evaluate the triggering event with respect to similar triggering events involving the first account and additional accounts similar to the second account or not involving the first account at all. As an intermediary to facilitate transactions between accounts, the server 102 is configured to monitor communications between all supplier accounts and all buyer accounts and between all employer accounts and all employee accounts. Therefore, the server 102 can be programmed to evaluate the triggering event with respect to the transactions between the first account and other accounts similar to the second account.

In some embodiments, when the first account is a supplier account and the second account is a buyer account, the server 102 can be configured to determine whether certain triggering events affected certain buyer accounts. The certain triggering events can be other triggering events that occurred during a recent time range or involved the change of the same type of entity as the current triggering event. The certain buyer accounts can be other buyer accounts communicating with the first account or in the same industry as the second account. For example, the third party might have decided to take-over the first account for a transaction with the second account that is associated with a large payment. Thus, when the triggering event is the first account including a new value for the remit-to address in an invoice for the transaction, the server 102 can be configured to determine that the remit-to address for transactions between the first account and other buyer accounts still has the same value and thus increase the score for the triggering event. Similarly, when the first account is a buyer account and the second account is a supplier account, the server 102 can be configured to determine whether certain triggering events affected certain supplier accounts. For example, the third party might have decided to take-over the first account for a transaction with the second account that is associated with a valuable product. Thus, when the triggering event is the first account including a new value as the ship-to address in a purchase order for the transaction, the server 102 can be configured to determine that the ship-to address for transactions between the first account and other supplier accounts still has the same value and thus increase the score for the triggering event. In general, the server 102 can be configured to apply statistical techniques known to someone skilled in the art to determine whether the triggering event is highly unusual within transactions involving the first party and increase the score of the triggering event accordingly.

In some embodiments, the server 102 is programmed to evaluate the triggering event with respect to triggering events involving the other accounts similar to the first account. For example, when a supplier account associated with a particular industry typically offers a remit-to address instead of banking information for receiving payments, when the first account is a supplier account and the triggering event is the first account deleting the remit-to address and adding new banking information within the first account, the server 102 can be configured to increase the score of the triggering event. For further example, when an employee account under an employer account typically changes account credentials periodically, when the first account is an employee account the triggering event is the first party changing the account credentials at or near the expected time within a period, the server 102 can be configured to increase the score of the triggering event less or not at all. In general, the server 102 can be configured to apply statistical techniques known to someone in the art to determine whether the triggering event is highly unusual within transactions involving accounts similar to the first party and increase the score of the triggering event accordingly.

In some embodiments, the server 102 is programmed to evaluate the triggering event with prior triggering events involving the first party and the second party. As discussed above, an account takeover often comprises a series of events, such as accessing an account, changing credentials or permissions for the account, changing banking information or delivery information in the account, and/or causing a transaction document to be generated and submitted. Furthermore, the amount of time between successive triggering events in the series tends to be relatively brief so that the third party could complete the takeover of the first account as quickly as possible.

In some embodiments, the server 102 thus can be programmed to increase the score of the triggering event for each prior triggering event that has occurred and can logically form a series with the triggering event between the first account and the second account. In one example, when the first account is a supplier account and the triggering event is the first party generating an invoice that contains banking information different from the banking information in the last invoice issued from the first account to the second account or another account, the prior triggering event where a new computer device accessed the first account with the last week can lead to an increase of the score of the triggering event. In a second example, when the first account is an employee account and the triggering event is the first account generating an expense report containing banking information different from the banking information in the first account, a first prior triggering event where the account credentials of the employee account were changed twelve hours ago and a second prior triggering event where the banking information in the employee account was changed six hours ago could each lead to an increase of the score of the triggering event. In a third example, when the first account is a buyer account and the triggering event is another buyer account being taken over by a certain party, a prior triggering event where the certain party accessed the first account can lead to an increase of the score of the triggering event.

In some embodiments, the server 102 can be further configured to also increase the score when the amount of time between successive ones of these triggering events in a series is below a certain threshold. Specifically, the server 102 can be configured to compute the threshold from data related to past instances of account takeover fraud across accounts similar to the first accounts or all the accounts.

3.2. Handling Potential Fraud Related to Account Takeover

In some embodiments, the server 102 is programmed to report potential fraud as soon as the potential fraud is detected or even as soon as a triggering event occurs. The reporting can also wait until a potentially fraudulent transaction document issued from a first account (taken-over account) is transmitted to a second account (affected account) communicating with the first account. The server 102 is programmed to send a report of the potential fraud to a first computer associated with the first account before the detecting of the potential fraud or a second computer associated with the second account. The server 102 can also be programmed to save the report in the second account and send a notification of the report to the associated second computer.

In some embodiments, the server 102 is programmed to report potential fraud to the first account or the second account. The report can include information identifying the first account, the party who has potentially taken over the first account, or the triggering event identified as corresponding to the potential fraud. Information regarding a triggering event might additionally indicate both a value being replaced, such as an old delivery address, and the replacing value, such as a new delivery address, the score assigned to the triggering event, the time when the triggering event occurred, or the original account takeover reported in the community. The report can include further information related to the detection of the potential fraud, such as the reasons why one or more triggering events were identified as potential account takeover fraud. The further information can be presented later in response to a request for supporting evidence. The reasons could refer to the different pieces of data used to assess the triggering event, as discussed in Section 3.1.2, such as other relevant data in the first account, historical transactional data involving the first account or other accounts similar to the first account, or information regarding instances of account takeover across all managed accounts. The reasons could also refer to the different thresholds used to assess the triggering event, as further discussed in Section 3.1.2, such as when a change to an account password or a remit-to address is considered unusual or when an amount of time between successive triggering events is considered brief. The reasons could also indicate the rule or contract clause that is violated.

In some embodiments, the report of potential fraud communicated to first computer can further include a request for confirming or dismissing the account takeover. The server 102 can be programmed to deactivate the first account upon detecting potential fraud and re-activate the first account upon receiving a dismissal of the potential fraud from the first computer. The server 102 can be programmed to deactivate the first account upon receiving a confirmation of the potential fraud from the first computer. The server can also be programmed to update and reactivate the first account upon receiving the confirmation with the correct value for any entity updated during the relevant triggering event.

In some embodiments, the server 102 can be programmed to block current transactions or subsequent transactions involving the first account or review recent transactions involving the first account upon detecting potential fraud. The server 102 can be further programmed to release the block when the potential fraud is resolved or when an instruction to do so is received from the second computer or another computer of an affected account involved in any of these transactions. For a current transaction awaiting execution of a transaction document that contains suspicious information, a report of the potential fraud may be transmitted to the second computer with the transaction document and a request for unblocking the current transaction. Such a report may prompt a second party of the second account to consult prior exchanges with or submit a new inquiry to the first party of the first account regarding the suspicious information. For a current transaction awaiting receipt of a product or a payment, the transmission of the product or payment can be suspended and the potential fraud may be reported to the second computer with a notice of the suspension and a request for resuming the current transaction by the second account. Alternatively, without placing any block yet the server 102 can be configured to transmit a report of the potential fraud to the second computer with a request for a blocking confirmation. As another alternative, the server 102 can be configured to directly reject or terminate the current or subsequent transactions in response to detecting potential fraud, typically based on prior instructions from the second account or requirements in the second account. The instructions or requirements that the blocking, rejection, or termination can become effective as soon as the potential fraud is identified, only when the potential fraud involves a takeover of a certain account or certain types of accounts, or only for transactions involving certain monetary values or addresses, for example. In addition, the server 102 can be programmed to send notifications to other accounts that have communicated with the first account or that are similar to the first account or treat the detection of the potential fraud as a triggering event for other managed accounts.

Figure 3A:
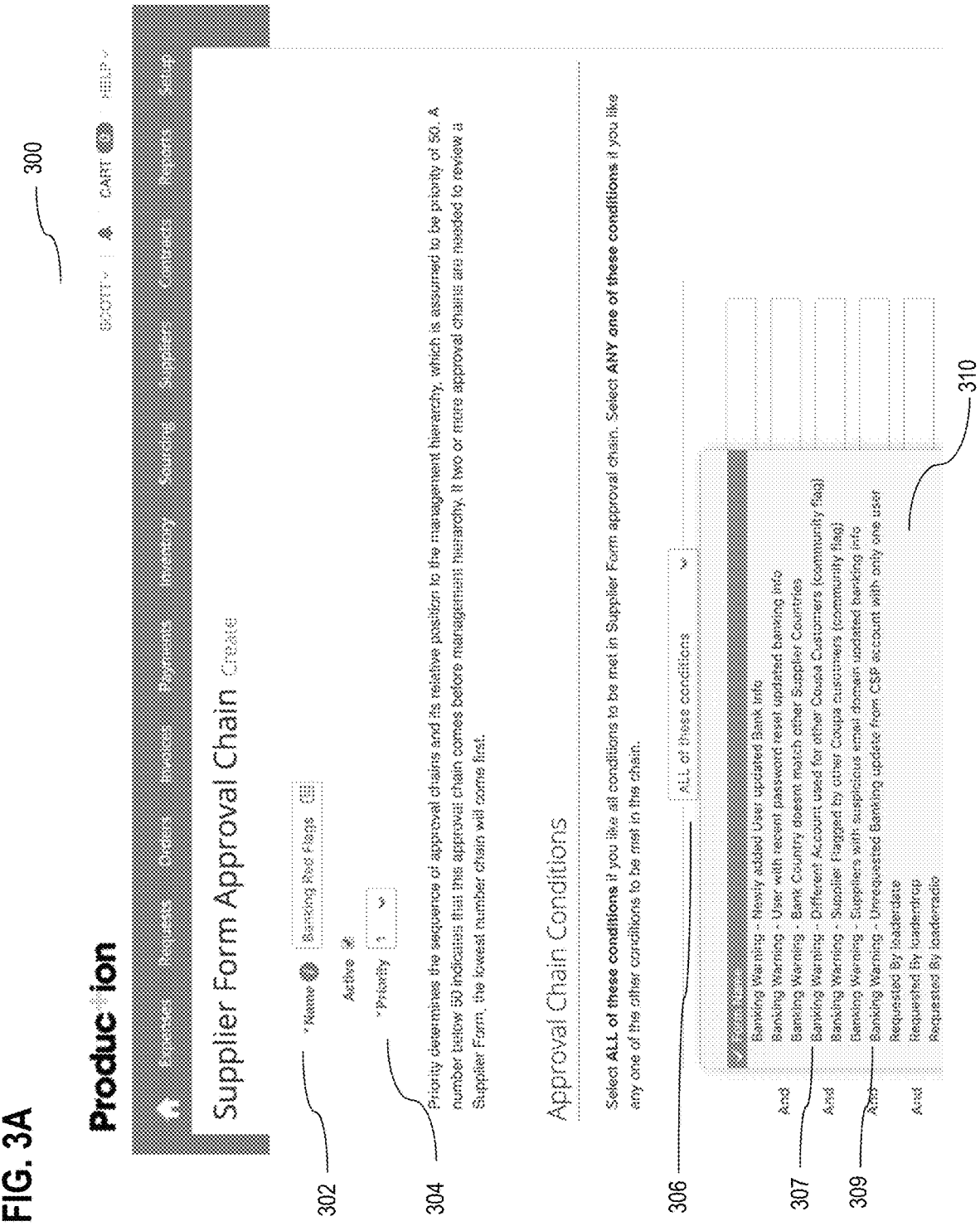
FIG. 3A illustrates an example screen of a graphical user interface programmed to allow configuring the approval process for a supplier information management form associated with a supplier account.

In some embodiments, the server 102 is programmed to allow a user to configure when to receive notifications related to potential account takeover fraud and what types of notifications to receive. FIG. 3A illustrates an example screen of a graphical user interface programmed to allow configuring the approval process for a supplier information management form associated with a supplier account. In some embodiments, the screen 300 is presented by a buyer computer associated with a buyer account. The configuration determines when and how information regarding certain triggering events discussed above is communicated to a buyer account. The screen 300 includes an option 302 for identifying an approval event in the approval process or chain. The value for the option 302, which is "Banking Red Flags" in this example, can be selected from a list of event names. The screen 300 also includes an option 304 for specifying the priority of the event in the approval process. In this example, the value for the option 304 is 1, indicating a high priority or specifically that banking red flags are to be checked at or near the beginning of the approval process. The screen 300 also includes an option 306 for viewing and selecting approval chain conditions to be associated with this approval event. In response to the selection of the option 306, the screen 300 may include a selectable list 310 of approval chain conditions that correspond to triggering events, including an entry corresponding to all the approval chain conditions. In this example, the selectable list 310 includes an entry 307 for the condition that a different account (e.g., external bank account) has been used for another specific customer (e.g., another specific buyer account communicating with the supplier account). The different account could be with respect to a previous account used for the specific customer or to the accounts for the present buyer account. The entry 307 also indicates that when this condition corresponds to a triggering event that has occurred to another account in a community (e.g., a certain group of buyer accounts) rather than between the present supplier account and buyer account. The selectable list 301 also includes an entry 309 for the condition that an unrequested banking information update has been to the supplier account that is associated with only one user (e.g., an employee account under the supplier account). The requested update may be made by an employee account other than the only user. The selectable list 301 can include additional entries for various other conditions, such as the condition that a newly added user (e.g., employee account) has updated the banking information in the supplier account, an existing user (e.g., employee account) with a recently changed password has updated the banking information in the supplier account, the country information of the bank account associated with the supplier account has been updated such that the country information no longer matches other country information in the supplier account, another buyer account has flagged this supplier account as have potentially committed fraud (e.g., account takeover fraud), or the email address in the supplier account has been updated such that the email address now matches a list of suspicious email domains and the banking information has been updated. The various configuration values discussed above can be saved and will be applied in an approval process, as further discussed below.

Figure 3B:
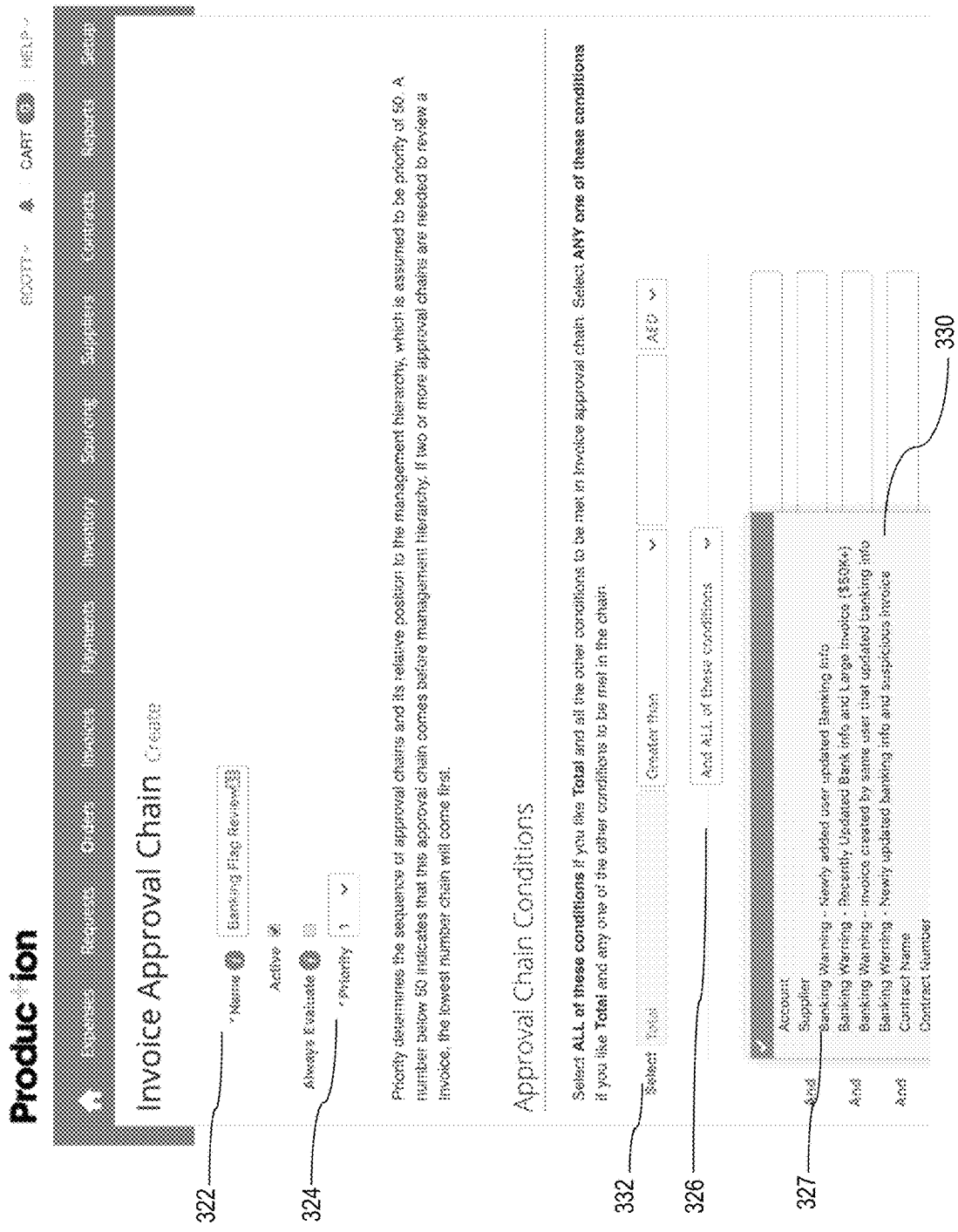
FIG. 3B illustrates an example screen of a graphical user interface programmed to allow configuring the approval process for an invoice associated with a supplier account.

FIG. 3B illustrates an example screen of a graphical user interface programmed to allow configuring the approval process for an invoice associated with a supplier account. In some embodiments, the screen 320 is presented by a buyer computer associated with a buyer account. The configuration determines when and how information regarding certain triggering events discussed above is communicated to a buyer account. Similar to the screen 300 illustrated in FIG. 3A, the screen 320 includes an option 322 for identifying an approval event in the approval process or chain. The value for the option 322, which is "Banking Red Flags" in this example, can be selected from a list of event names. The screen 320 also includes an option 324 for specifying the priority of the event in the approval process. In this example, the value for the option 324 is 1, indicating a high priority or specifically that banking red flags are to be checked at or near the beginning of the approval process. The screen 320 additionally includes an option 332 for specifying a limit on the transaction to be approved, such as a minimum amount in a certain currency for which a triggering event is to occur. The screen 320 also includes an option 326 for viewing and selecting approval chain conditions to be associated with this approval event. In response to the selection of the option 326, the screen 320 may include a selectable list 330 of approval chain conditions, including an entry corresponding to all the approval chain conditions. In this example, the selectable list 330 includes an entry 327 for the condition that a newly added user (e.g., an employee account under the supplier account) has updated the banking information in the supplier account. The configuration values can be saved and will be applied in an approval process, as further discussed below. Additional screens similar to the screens 300 and 320 illustrated in FIG. 3A and FIG. 3B can be used for various approval processes related to the sending of payments, products, or other items to another account.

FIG. 4A illustrates an example screen of a graphical user interface programmed to show notifications, alarms, or warnings of triggering events during the approval process for a supplier information management form associated with a supplier account. In some embodiments, the screen 400 is presented by a buyer computer associated with a buyer account. The screen 400 includes a newly created or updated supplier information management form for review and approval. The screen 400 also includes information regarding a list 408 of relevant triggering events the occurrences of which have been detected. These triggering events may correspond to the approval chain conditions selected via the screen 300 illustrated in FIG. 3A. In this example, the list 408 includes an entry 402 for the triggering event that corresponds to the entry 309 illustrated in FIG. 3A. The entry 402 includes additional details regarding the triggering event, namely the email address of the only user and the updated banking information. The list 408 also includes an entry 404 for the triggering event that corresponds to the entry 307 illustrated in FIG. 3A. The entry 404 includes additional details, namely the updated banking information and the banking information used with other buyer accounts communicating with the supplier account. In addition, the list 408 includes contact information 406 of the supplier account as of a certain date, preferably before the occurrence of any of the listed triggering events. Specifically, the contact information 406 can comprise local contact information made available to the buyer account and community contact information made available to other buyer accounts communicating with the supplier account. The contact information 406 enables an investigation of the triggering event with a supplier of the supplier account before approving or disapproving the supplier information management form.

Figure 4B:
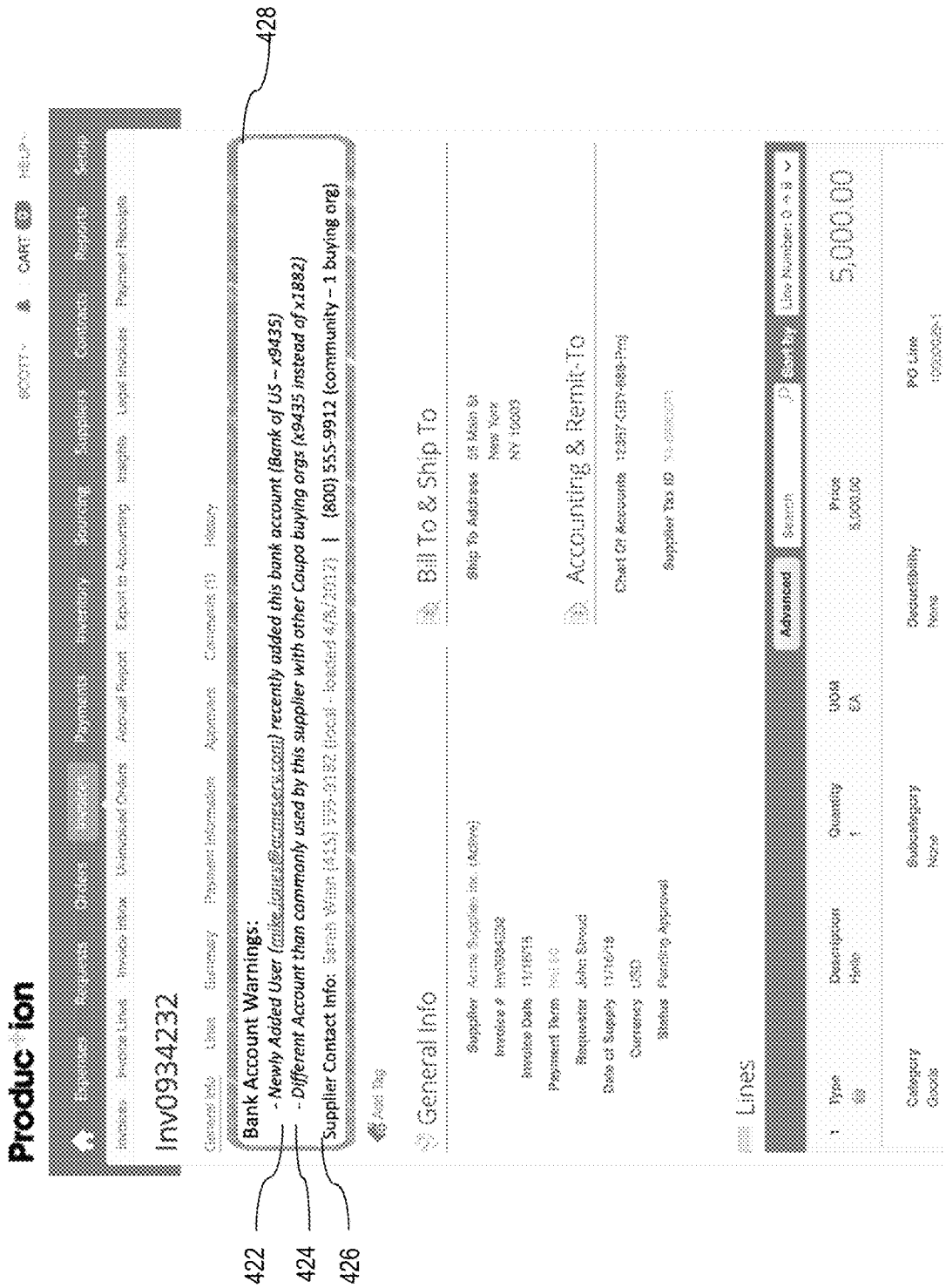
FIG. 4B illustrates an example screen of a graphical user interface programmed to show notifications, alarms, or warnings of triggering events during the approval process for an invoice associated with a supplier account.

FIG. 4B illustrates an example screen of a graphical user interface programmed to show notifications, alarms, or warnings of triggering events during the approval process for an invoice. In some embodiments, the screen 420 is presented by a buyer computer associated with a buyer account. The screen 400 includes an invoice for review and approval. Similar to the screen 400 illustrated in FIG. 4A, the screen 420 also includes information regarding a list 428 of relevant triggering events the occurrences of which have been detected. These triggering events may correspond to the approval chain conditions selected via the screen 320 illustrated in FIG. 3B. In this example, the list 428 includes an entry 422 for the triggering event that corresponds to the entry 327 illustrated in FIG. 3B. The entry 422 includes additional details regarding the triggering event, namely the email address of the newly added user and the updated banking information. The list 428 also includes an entry 424 for the triggering event that the banking information in the supplier account for use with this buyer account has been updated and the updated banking information is different from the banking information for use with other buyer accounts communicating with the supplier account. The entry 424 includes additional details, namely the updated banking information and the banking information used with the other buyer accounts communicating with the supplier account. In addition, the list 428 includes contact information 426 of the supplier account. The contact information 426 enables an investigation of the triggering event with a supplier the supplier account before approving or disapproving the invoice.

Figure 5A:
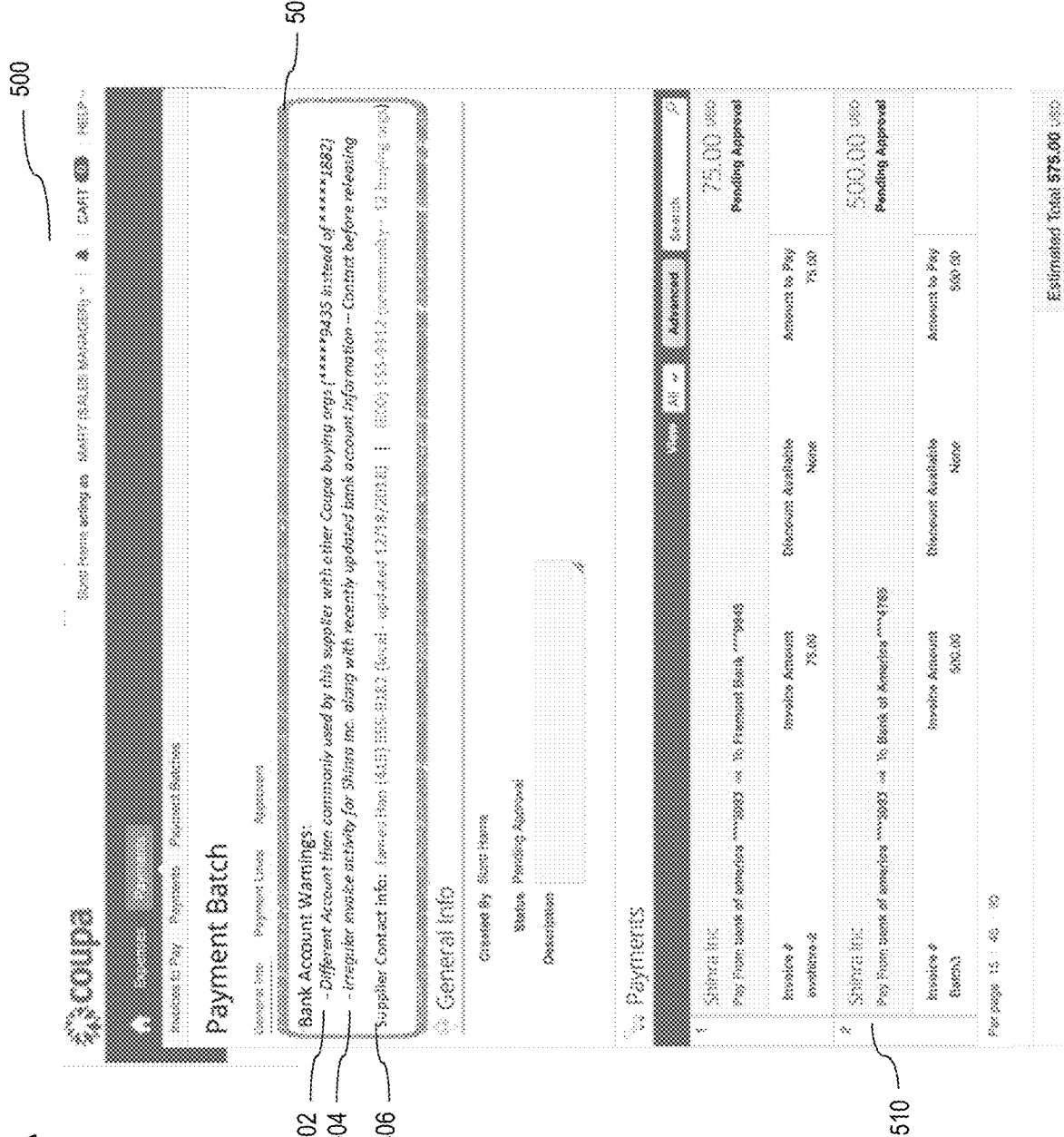
FIG. 5A illustrates an example screen of a graphical user interface programmed to show notifications, alarms, or warnings of triggering events during the approval process for a batch payment.

FIG. 5A illustrates an example screen of a graphical user interface programmed to show notifications, alarms, or warnings of triggering events during the approval process for a batch payment. In some embodiments, the screen 500 is presented by a buyer computer associated with a buyer account. The screen 500 includes a list of entries for pending payments to a respective list of supplier accounts for review and approval, such as the entry 510 for a pending payment of $500 to the supplier account of Shinra Inc. Similar to the screen 400 illustrated in FIG. 4A, the screen 500 also includes information regarding a list 508 of relevant triggering events the occurrences of which have been detected. In this example, the list 508 includes an entry 502 for the triggering event that the banking information in the supplier account for use with this buyer account has been updated and the updated banking information is different from the banking information for use with other buyer accounts communicating with the supplier account. The entry 506 includes additional details, namely the updated banking information and the banking information used with the other buyer accounts communicating with the supplier account. The list 508 also includes an entry 504 for the triggering event that the banking information in the supplier account of Shinra Inc. has been updated and an invoice containing irregular information, such as an unusually large invoice amount, has been issued from the supplier account. The entry 504 contains the additional recommendation or instruction or contacting a supplier of the supplier account before approving the pending payment and releasing the fund. Thus, the list 508 also includes the contact information 506 of that supplier account.

Figure 5B:
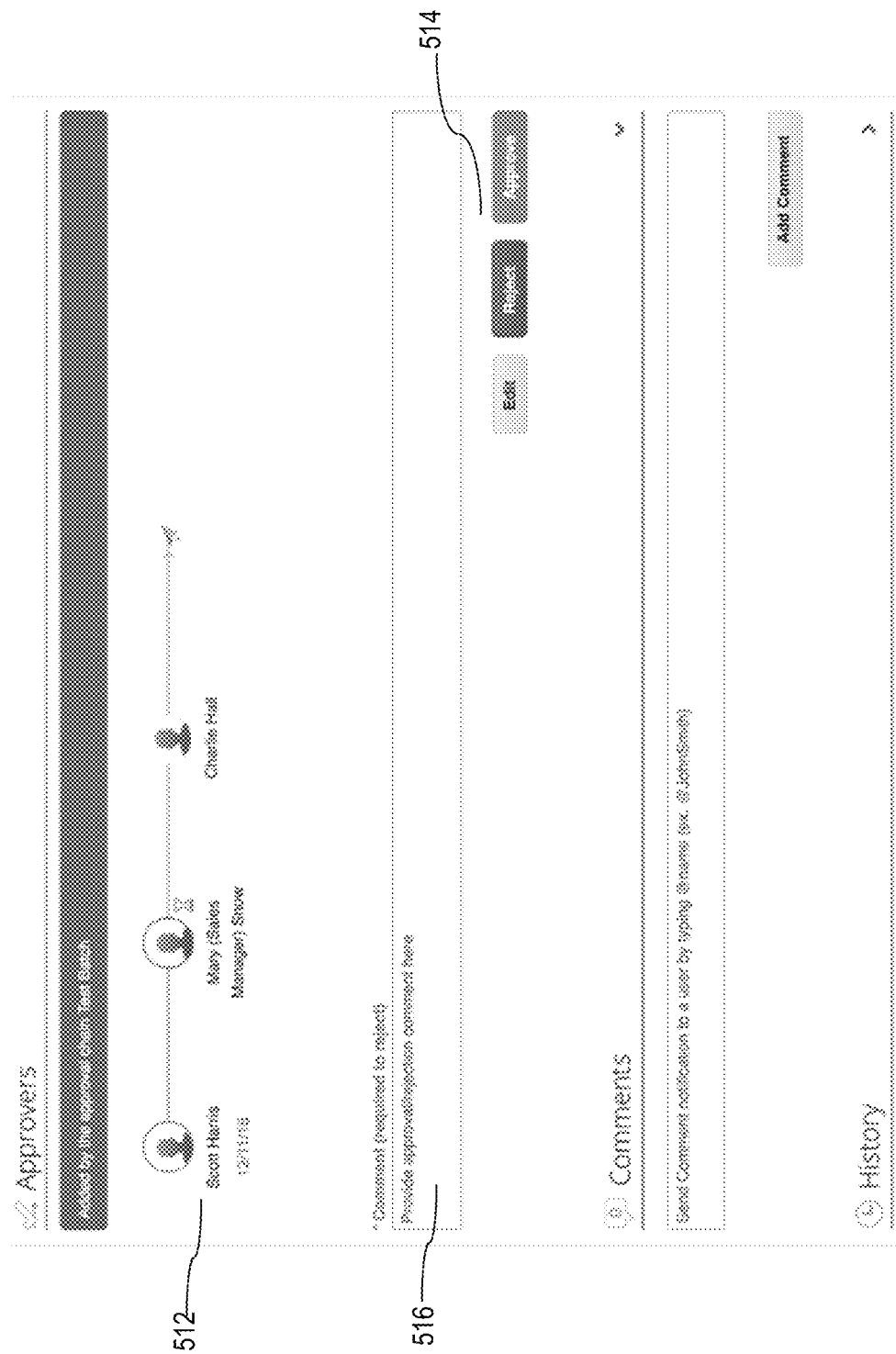
FIG. 5B illustrates an example screen of a graphical user interface programmed to show notifications, alarms, or warnings of triggering events during the approval process for a batch payment.

FIG. 5B illustrates an example screen of a graphical user interface programmed to show notifications, alarms, or warnings of triggering events during the approval process for a batch payment. The screen illustrated in FIG. 5B is an extension of the form 500 illustrated in FIG. 5A. In some embodiments, the form 500 additionally includes information regarding the list of approvers 512 (e.g., employee accounts under the buyer account) for the approval process, including the current approver. The form 500 also includes certain options 514 for the current approver to indicate how to handle the list of pending payments, including a rejection and an approval, and a comment field 516 for indicating a reason for choosing one of the options 514, to form a history of approval records for auditing or other purposes. Additional screens similar to the screens 400, 420, and 500 illustrated in FIG. 4A, FIG. 4B, FIG. 5A, and FIG. 5B can be used for various approval processes related to the sending of payments, products, or other items to another account.

Figure 6:
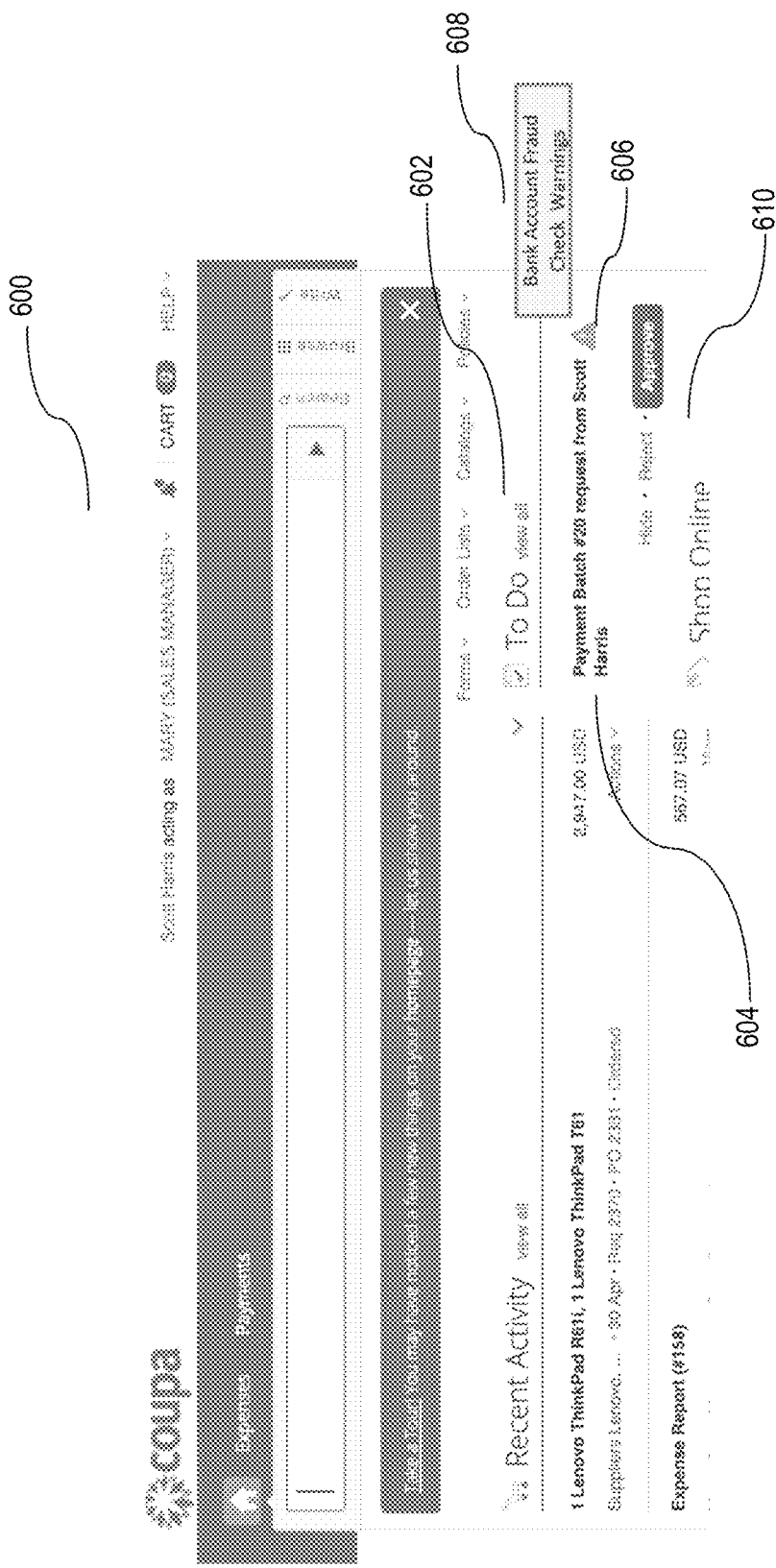
FIG. 6 illustrates an example screen of a graphical user interface programmed to programmed to show notifications, alarms, or warnings of triggering events within a dashboard for an account.

FIG. 6 illustrates an example screen of a graphical user interface programmed to show notifications, alarms, or warnings of triggering events within a dashboard for an account. In some embodiments, the screen 600 is presented by a computer associated with the account, such as an employee account of an approver. The screen 600 includes a section 602 showing a list of items for pending tasks including the item 604 for the pending task of approving a batch payment. The item 604 is shown with a warning sign 606, an interaction with which can trigger a further display of a warning message 608 corresponding to one or more triggering events. The item 604 is also shown with a list of options 610 for handling the pending task, such as the reject option. A selection of any of the list of options 610 can lead to a presentation of another screen with details, such as the screen 500 illustrated in FIG. 5A or FIG. 5B, or a direct handling of the pending task. For example, in response to the selection of the reject option, transmission of the batch of payments is then blocked until any potential fraud corresponding to the one or more triggering events is resolved.

4. Example Processes

Figure 7:
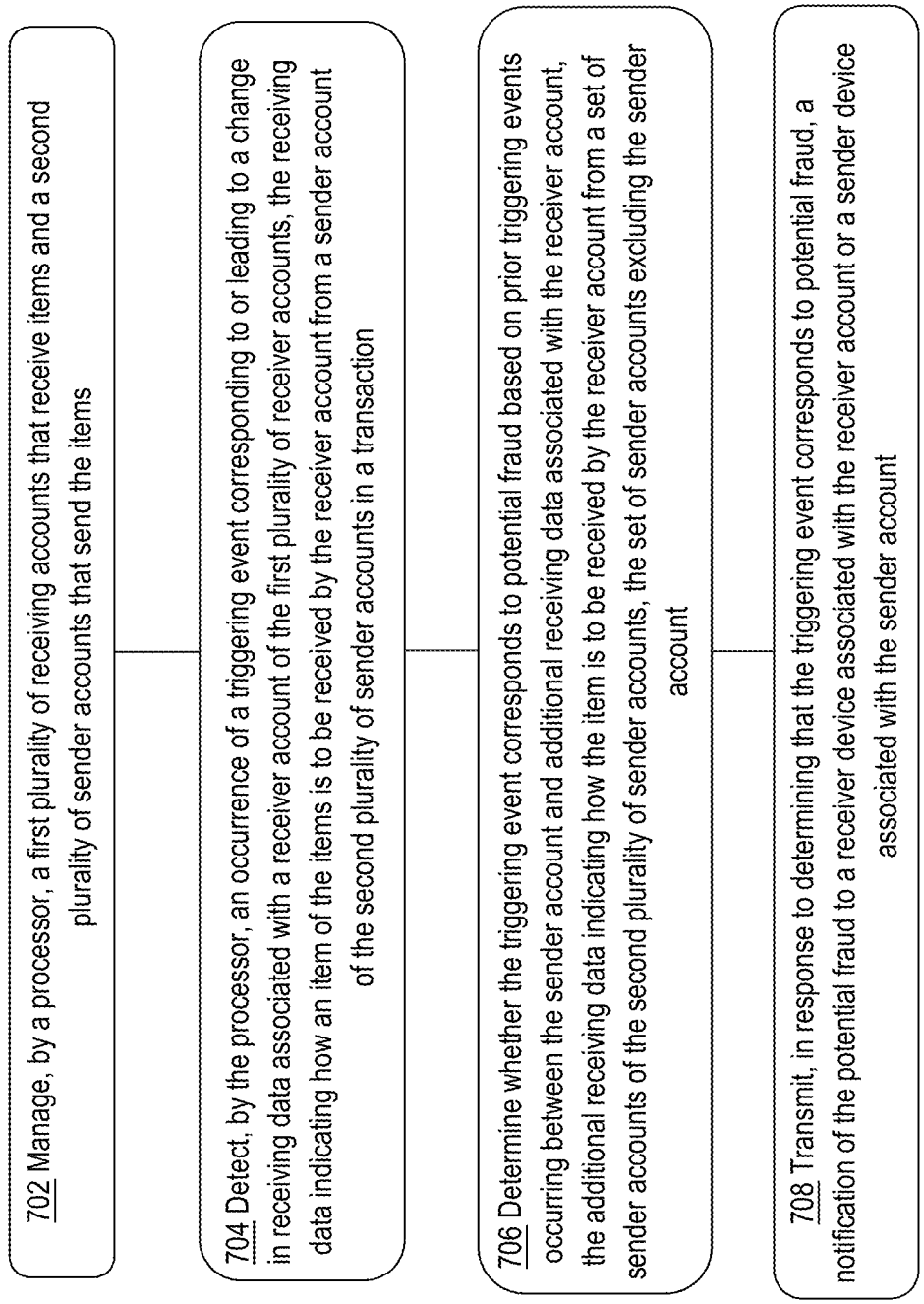
FIG. 7 illustrates an example process performed by a fraud detection server computer of detecting potential account takeover fraud.

FIG. 7 illustrates an example process performed by the fraud detection server computer of detecting potential account takeover fraud. FIG. 7 is shown in simplified, schematic format for purposes of illustrating a clear example and other embodiments may include more, fewer, or different elements connected in various manners. FIG. 7 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 702, the server 102 is programmed or configured to manage a first plurality of receiver accounts that receive items and a second plurality of sender accounts that send the items. The items can include a payment or a product of goods or services.

In some embodiments, in step 704, the server 102 is programmed or configured to detect an occurrence of a triggering event corresponding to or leading to a change in receiving data associated with a receiver account of the first plurality of receiver accounts, as discussed in Section 3.1.1. The receiving data typically indicates how an item of the items is to be received by the receiver account from a sender account of the second plurality of sender accounts in a transaction. Examples of the receiving data include banking information or delivery information. The receiver account can be a supplier account to receive a payment, a buyer account to receive a product, or an employee account to receive a payment as a reimbursement.

In some embodiments, the server 102 is programmed or configured to receive from the sender device a selection from a plurality of time points to receive a notification of a triggering event. The plurality of time points can include immediately following detecting an occurrence of the triggering event, when the next transaction document is transmitted to the sender device, or immediately following determining that the triggering event corresponds to potential fraud.

In some embodiments, the triggering event includes a change of mechanism to access the sender account, a change of credentials or permissions for the receiver account, a change of the receiving data in the receiver account, a change of the receiving data in a transaction document for the transaction, a deviation of an amount of the item to be sent from a range in a transaction document for the transaction, a violation of a rule or an agreement, or a notification of a takeover of a second sender account of the plurality of sender accounts. In addition, the transaction document can be a supplier onboarding form, a buyer purchase order, a supplier invoice, a buyer payment form, a supplier payment receipt, or an employee expense report. In other embodiments, in response to detecting an occurrence of the triggering event, the server 102 is programmed to cause displaying an additional notification of the triggering event with a transaction document by the sender device.

In some embodiments, in step 706, the server 102 is programmed or configured to determine whether the triggering event corresponds to potential fraud based on prior triggering events occurring between the sender account and additional receiving data associated with the receiver account, as discussed in Section 3.1.2. Specifically, the determining can comprise judging how many triggering events corresponding to or leading to the change in the receiving data preceded the triggering event and together with the triggering event formed a series of triggering events or how much time passed between each successive pair of the series of triggering events. The additional receiving data typically indicates how the item is to be received by the receiver account from a set of sender accounts of the second plurality of sender accounts, with the set of sender accounts excluding the sender account.

In some embodiments, the determining can further comprise judging whether the triggering event is consistent with existing data in the receiver account or historical data related to prior transactions between the receiver account and the sender account or whether the triggering matches an existing blacklist of external accounts. The determination can further be based on broader receiving data associated with other sender accounts.

In some embodiments, in step 708, the server 102 is programmed or configured to transmit, in response to determine that the triggering event corresponds to potential fraud, a notification of the potential fraud to a receiver device associated with the receiver account or a sender device associated with the sender account, as discussed in Section 3.2. The notification can include a previous value of a piece of data associated with the receiver account effective before the triggering event and a current value of the piece of data effective after the triggering event.

In some embodiments, the receiver device was associated with the receiver account before the triggering event according to account data of the receiver account. The notification to the receiver device can include a request for verifying the change in the receiving data to confirm or dismiss the potential fraud. In response to receiving a confirmation of the potential fraud and a new value for a piece of data associated with the receiver account, the server 102 can be programmed or configured to update the piece of data with the new value. In response to receiving a dismissal of the potential fraud, the server can be programmed or configured to re-activate the receiver account, resume the transaction, or allow the transaction to occur. The notification to the sender device can include a request for confirming blocking or postponing the transaction. In other embodiments, in response to determining that the triggering event corresponds to potential fraud, the server 102 can be programmed to automatically deactivate the receiver account or blocking or postponing the transaction.

5. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 8:
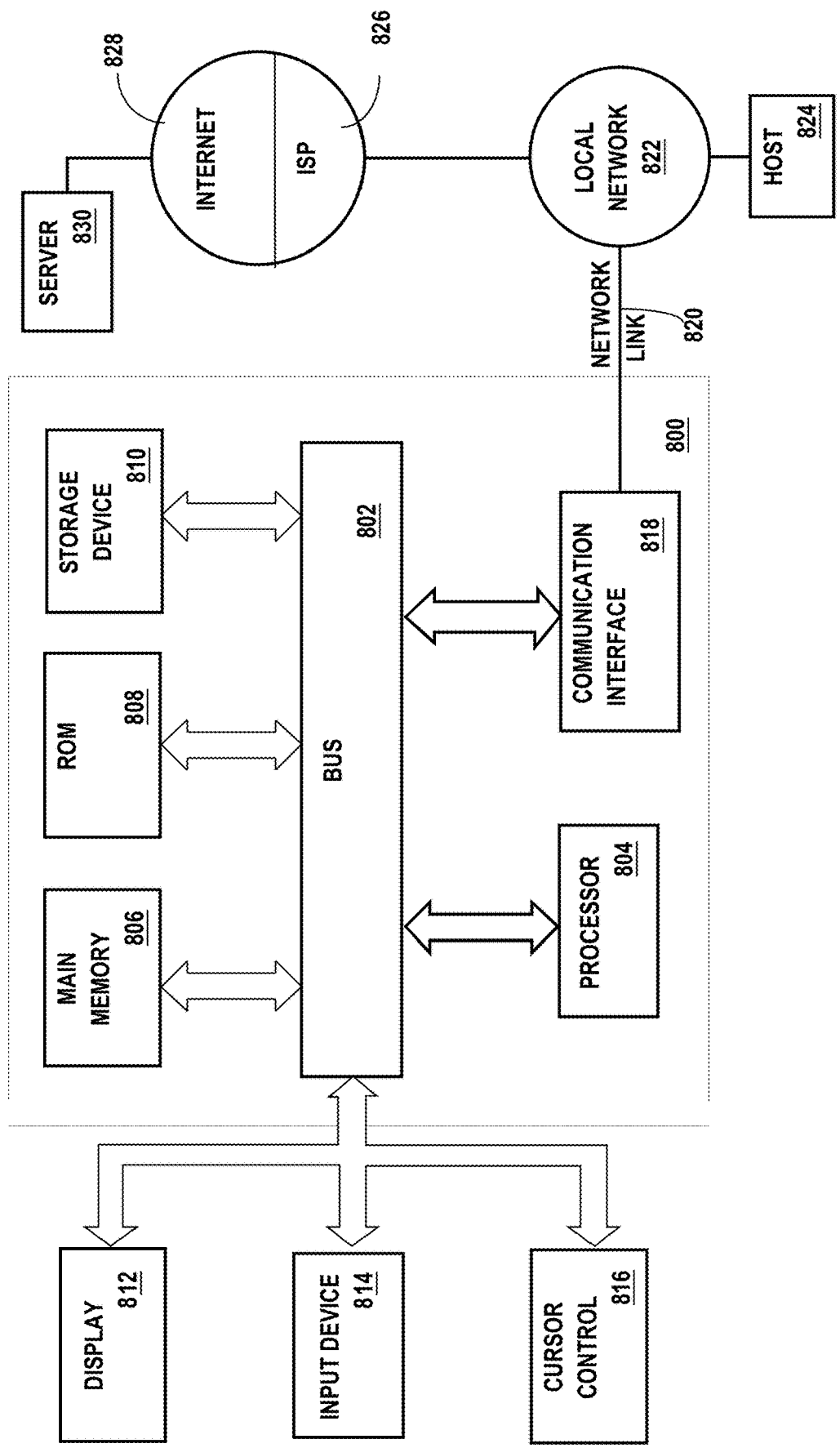
FIG. 8 is a block diagram that illustrates a computer system upon which an embodiment of the invention may be implemented.

FIG. 8 is a block diagram that illustrates an example computer system with which an embodiment may be implemented. In the example of FIG. 8, a computer system 800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 800 includes an input/output (I/O) subsystem 802 which may include a bus and/or other communication mechanism(s) for communicating information and/or instructions between the components of the computer system 800 over electronic signal paths. The I/O subsystem 802 may include an I/O controller, a memory controller and at least one I/O port. The electronic signal paths are represented schematically in the drawings, for example as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system or a graphics processing unit (GPU) or a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk or optical disk such as CD-ROM or DVD-ROM, and may be coupled to I/O subsystem 802 for storing information and instructions. Storage 810 is an example of a non-transitory computer-readable medium that may be used to store instructions and data which when executed by the processor 804 cause performing computer-implemented methods to execute the techniques herein.

The instructions in memory 806, ROM 808 or storage 810 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 800 may be coupled via I/O subsystem 802 to at least one output device 812. In one embodiment, output device 812 is a digital computer display. Examples of a display that may be used in various embodiments include a touch screen display or a light-emitting diode (LED) display or a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

At least one input device 814 is coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on display 812. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

In another embodiment, computer system 800 may comprise an internet of things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware and interfaces for generating position reporting packets, notifications, pulse or heartbeat signals, or other recurring data transmissions that specify a position of the computer system 800, alone or in combination with other application-specific data, directed toward host 824 or server 830.

Computer system 800 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to be read by computer system 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to bus 802. Communication interface 818 provides a two-way data communication coupling to network link(s) 820 that are directly or indirectly connected to at least one communication networks, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 822 broadly represents a local area network (LAN), wide-area network (WAN), campus network, internetwork or any combination thereof. Communication interface 818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a world-wide packet data communication network represented as internet 828. A server computer 830 may be coupled to internet 828. Server 830 broadly represents any computer, data center, virtual machine or virtual computing instance with or without a hypervisor, or computer executing a containerized program system such as DOCKER or KUBERNETES. Server 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server 830 may form elements of a distributed computing system that includes other computers, a processing cluster, server farm or other organization of computers that cooperate to perform tasks or execute applications or services. Server 830 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 830 may comprise a web application server that hosts a presentation layer, application layer and data storage layer such as a relational database system using structured query language (SQL) or no SQL, an object store, a graph database, a flat file system or other data storage.

Computer system 800 can send messages and receive data and instructions, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage 810, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6.0. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method of detecting and reporting potential account takeover fraud, comprising:

managing, by a processor, a first plurality of receiver accounts that receive items via a plurality of receiver devices and a second plurality of sender accounts that send the items via a plurality of sender devices, the first plurality of receiver accounts and the second plurality of sender accounts having respective digital account credentials, including a first identifier and a password, and data access permissions to control account access;

receiving, by the processor, a specification of a triggering event in an approval process, the triggering event corresponding to or leading to a change in receiving data associated with a receiver account of the first plurality of receiver accounts, the receiving data indicating how an item of the items is to be received by the receiver account from a sender account of the second plurality of sender accounts in a transaction, the triggering event comprising a change of an electronic device that accesses the receiver account in terms of an IP address or device type;

monitoring online communications between the first plurality of receiver accounts and the second plurality of sender accounts, including generation or transmission of digital transaction documents;

detecting, based on the monitoring, an occurrence of the triggering event;

determining whether the triggering event corresponds to potential fraud based on prior triggering events occurring between the sender account and the receiver account and additional receiving data associated with the receiver account using statistical techniques, the additional receiving data indicating how the item is to be received by the receiver account from a set of sender accounts of the second plurality of sender accounts, the set of sender accounts excluding the sender account;

in response to determining that the triggering event corresponds to potential fraud, causing a notification of the potential fraud to be displayed by a receiver device associated with the receiver account in the approval process corresponding to an approval chain condition required to advance the transaction, wherein the notification includes a request for a confirmation or dismissal of the potential fraud to complete the approval chain condition, and deactivating the receiver account or blocking the transaction;

receiving a confirmation of the potential fraud and a correct value for an entity in the receiving data that was changed during the triggering event or a dismissal of the potential fraud from the receiver device associated with the receiver account;

in response to receiving the confirmation of the potential fraud and the correct value, setting the entity to the correct value;

in response to receiving the dismissal of the potential fraud, updating and re-activating the receiver account, resuming the transaction, or allowing the transaction to occur.

2. The computer-implemented method of claim 1,
the items including a payment or a product of goods or services,
the receiver account being a supplier account to receive a payment, a buyer account to receive a product, or an employee account to receive a payment as a reimbursement.

3. The computer-implemented method of claim 1, the receiving data including banking information or delivery information.

4. The computer-implemented method of claim 1, the triggering event further including a change of mechanism to access the sender account, a change of the receiving data in the receiver account, a change of the receiving data in a transaction document for the transaction, a deviation of an amount of the item to be sent from a range in a transaction document for the transaction a violation of a rule or an agreement, or a notification of a takeover of a second sender account of the plurality of sender accounts.

5. The computer-implemented method of claim 4, the transaction document being a supplier onboarding form, a buyer purchase order, a supplier invoice, a buyer payment form, a supplier payment receipt, or an employee expense report.

6. The computer-implemented method of claim 1, the determining comprising judging whether the triggering event is consistent with existing data in the receiver account or historical data related to prior transactions between the receiver account and the sender account.

7. The computer-implemented method of claim 1, the determining comprising judging how many triggering events corresponding to or leading to the change in the receiving data preceded the triggering event and together with the triggering event formed a series of triggering events or how much time passed between each successive pair of the series of triggering events.

8. The computer-implemented method of claim 1, the notification including a previous value of a piece of data associated with the receiver account effective before the triggering event and a current value of the piece of data effective after the triggering event.

9. The computer-implemented method of claim 1,
the receiver device being associated with the receiver account before the triggering event,
the notification to the receiver device including a request for verifying the change in the receiving data to confirm or dismiss the potential fraud.

10. The computer-implemented method of claim 1, further comprising:
in response to determining that the triggering event corresponds to potential fraud, transmitting a notification of the potential fraud to a sender device associated with the sender account.

11. The computer-implemented method of claim 1, the notification to the sender device including a request for confirming blocking or postponing the transaction.

12. The computer-implemented method of claim 1, further comprising, in response to determining that the triggering event corresponds to potential fraud, automatically deactivating the receiver account or blocking or postponing the transaction.

13. The computer-implemented method of claim 1, further comprising, in response to detecting an occurrence of the triggering event, causing displaying an additional notification of the triggering event with a transaction document by the sender device.

14. The computer-implemented method of claim 1, further comprising
receiving from the sender device a selection from a plurality of time points to receive a notification of a triggering event,
the plurality of time points including immediately following detecting an occurrence of the triggering event, when the next transaction document is transmitted to the sender device, or immediately following determining that the triggering event corresponds to potential fraud.

15. One or more non-transitory storage media storing instructions which, when executed by one or more computing devices, cause performance of a method of detecting potential fraud related to supplier accounts and reporting potential fraud, the method comprising:
managing a first plurality of receiver accounts that receive items via a plurality of receiver devices and a second plurality of sender accounts that send the items via a plurality of sender devices,
the first plurality of receiver accounts and the second plurality of sender accounts having respective digital account credentials, including a first identifier and a password, and data access permissions to control account access;
receiving a triggering event in an approval process, the triggering event corresponding to or leading to a change in receiving data associated with a receiver account of the first plurality of receiver accounts,
the receiving data indicating how an item of the items is to be received by the receiver account from a sender account of the second plurality of sender accounts in a transaction,
the triggering event comprising a change of an electronic device that accesses the receiver account in terms of an IP address or device type;
monitoring online communications between the first plurality of receiver accounts and the second plurality of sender accounts, including generation or transmission of digital transaction documents;
detecting, based on the monitoring, an occurrence of the triggering event;
determining whether the triggering event corresponds to potential fraud based on prior triggering events occurring between the sender account and the receiver account and additional receiving data associated with the receiver account using statistical techniques,
the additional receiving data indicating how the item is to be received by the receiver account from a set of sender accounts of the second plurality of sender accounts, the set of sender accounts excluding the sender account;
in response to determining that the triggering event corresponds to potential fraud, causing a notification of the potential fraud to be displayed by a receiver device associated with the receiver account in the approval process corresponding to an approval chain condition required to advance the transaction, wherein the notification includes a request for a confirmation or dismissal of the potential fraud to complete the approval chain condition, and deactivating the receiver account or blocking the transaction;
receiving a confirmation of the potential fraud and a correct value for an entity in the receiving data that was changed during the triggering event or a dismissal of the potential fraud from the receiver device associated with the receiver account;
in response to receiving the confirmation of the potential fraud and the correct value, setting the entity to the correct value;
in response to receiving the dismissal of the potential fraud, re-activating the receiver account, resuming the transaction, or allowing the transaction to occur.

16. The one or more non-transitory storage media of claim 15, the determining comprising judging whether the triggering event is consistent with existing data in the receiver account or historical data related to prior transactions between the receiver account and the sender account.

17. The one or more non-transitory storage media of claim 15, the determining comprising judging how many triggering events corresponding to or leading to the change in the receiving data preceded the triggering event and together with the triggering event formed a series of triggering events or how much time passed between each successive pair of the series of triggering events.

18. The one or more non-transitory storage media of claim 15, the triggering event further including a change of mechanism to access the sender account, a change of the receiving data in the receiver account, a change of the receiving data in a transaction document for the transaction, a deviation of an amount of the item to be sent from a range in a transaction document for the transaction a violation of a rule or an agreement, or a notification of a takeover of a second sender account of the plurality of sender accounts.

19. The one or more non-transitory storage media of claim 15, the method further comprising, in response to detecting an occurrence of the triggering event, causing displaying an additional notification of the triggering event with a transaction document by the sender device.

20. The one or more non-transitory storage media of claim 15, the method further comprising
receiving from the sender device a selection from a plurality of time points to receive a notification of a triggering event,
the plurality of time points including immediately following detecting an occurrence of the triggering event, when the next transaction document is transmitted to the sender device, or immediately following determining that the triggering event corresponds to potential fraud.

* * * * *